(12) United States Patent
Sugiyama

(10) Patent No.: US 6,766,426 B1
(45) Date of Patent: Jul. 20, 2004

(54) APPARATUS AND METHOD FOR MOVING DATA AMONG MEMORIES OF NETWORKED DEVICES

(75) Inventor: Shigetoshi Sugiyama, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/539,284

(22) Filed: Mar. 30, 2000

(30) Foreign Application Priority Data

Mar. 31, 1999 (JP) ......................................... P11-091137
Mar. 31, 1999 (JP) ......................................... P11-091138

(51) Int. Cl.[7] .......................................... G06F 12/00
(52) U.S. Cl. ........................... 711/154; 74/150; 74/165
(58) Field of Search ................................ 711/154, 150, 711/165

(56) References Cited

U.S. PATENT DOCUMENTS

| | | | | |
|---|---|---|---|---|
| 5,893,140 A | * | 4/1999 | Vahalia et al. | 711/118 |
| 5,920,700 A | * | 7/1999 | Gordon et al. | 709/226 |
| 5,956,716 A | * | 9/1999 | Kenner et al. | 707/10 |
| 5,996,014 A | * | 11/1999 | Uchihori et al. | 709/226 |
| 6,021,464 A | * | 2/2000 | Yao et al. | 711/114 |
| 6,181,867 B1 | * | 1/2001 | Kenner et al. | 386/46 |
| 6,324,581 B1 | * | 11/2001 | Xu et al. | 709/229 |
| 6,366,987 B1 | * | 4/2002 | Tzelnic et al. | 711/162 |
| 6,374,336 B1 | * | 4/2002 | Peters et al. | 711/167 |

* cited by examiner

*Primary Examiner*—Mano Padmanabhan
*Assistant Examiner*—Paul Baker
(74) *Attorney, Agent, or Firm*—Jay H. Maioli

(57) ABSTRACT

An information processing apparatus and method and a program storage medium by which a recording medium of an apparatus connected to a network to which the information processing apparatus is connected can be utilized effectively wherein if reservation of recording of a predetermined program is performed for a video recorder, then a data amount necessary to record the reserved program is calculated. Then, those of apparatus connected to a network which include a recording medium which can record the calculated data amount are searched for. In response to a result of the search, a distribution of data amounts to be recorded into the recording media of those apparatus is determined. Then, areas are secured in the recordable areas of the recording media so that the determined data amount may be recorded.

13 Claims, 10 Drawing Sheets

APPARATUS AND METHOD FOR MOVING DATA AMONG MEMORIES OF NETWORKED DEVICES

BACKGROUND OF THE INVENTION

This invention relates to an information processing apparatus and method as well as a program storage medium, and more particularly to an information processing apparatus and method as well as a program storage medium by which data is recorded onto a recording medium of an apparatus connected to a network or, when the capacity of a recordable area of a recording medium becomes too small, data recorded thereon is moved to a recording medium of another apparatus connected to the network.

As a recording medium of video recorders for recording a program, a recording medium onto which a digital signal can be recorded such as a video disk in place of a video tape are available. A video recorder which uses a hard disk or a like recording medium is characterized, when compared with a video tape recorder which uses a video tape, in that it allows recording simultaneously with reproduction and allows immediate reproduction of a desired portion thereof.

Meanwhile, in recent years, networks have been and are being popularized, and it is possible to communicate data between a plurality of apparatus connected to a network.

Since such a video recorder which uses a hard disk as described above has the hard disk built therein, processing similar to processing with a video tape recorder which uses a video tape as a recording medium that, when the video tape is recorded fully with data, the video tape is replaced cannot be performed readily with the video recorder which uses a hard disk. Therefore, the video recorder which uses a hard disk has a subject to be solved in that a user must perform recording taking notice of a remaining capacity of the hard disk (capacity of a recordable area) so that the capacity of the hard disk may not be used up.

Meanwhile, many of apparatus connected to a network include a recording medium. However, it has not been carried out to exchange data between recording media of such apparatus to assure a recordable area of a predetermined apparatus.

SUMMARY OF THE INVENTION

It is an object of the present invention to provide an information processing apparatus and method as well as a program storage medium by which data is recorded onto a recording medium of an apparatus connected to a network to effectively utilize the recording medium.

It is another object of the present invention to provide an information processing apparatus and method as well as a program storage medium by which, when the capacity of a recordable area of a recording medium becomes little, data recorded on the recording medium is moved to a recordable area of a recording medium of another apparatus connected to a network so that the original recording medium normally remains in a condition wherein it has a recording area.

In order to attain the objects described above, according to an aspect of the present invention, there is provided an information processing apparatus, including searching means for searching, when an instruction to record data is received, for a recordable area of a recording medium provided in another apparatus connected to a network to which the information processing apparatus is connected, securing means for securing a recording area for recording the data in the recordable area searched out by the searching means, and recording means for recording the data into the recording area secured by the securing means.

According to another aspect of the present invention, there is provided an information processing method, including a searching step of searching, when an instruction to record data is received, for a recordable area of a recording medium provided in another apparatus connected to a network to which an information processing apparatus is connected, a securing step of securing a recording area for recording the data in the recordable area searched out by the searching step, and a recording step of recording the data into the recording area secured by the securing step.

According to a further aspect of the present invention, there is provided a program storage medium on which a computer-readable program is stored, the computer-readable program including a searching step of searching, when an instruction to record data is received, for a recordable area of a recording medium provided in another apparatus connected to a network to which an information processing apparatus is connected, a securing step of securing a recording area for recording the data in the recordable area searched out by the searching step, and a recording step of recording the data into the recording area secured by the securing step.

In the information processing apparatus, the information processing method and the program stored in the program storage medium, when an instruction to record data is inputted, a recording area for recording the data is secured in a recordable area of a recording medium provided in another apparatus connected to a network, and data is recorded into the thus secured recording area. Consequently, a recording medium connected to the network can be utilized efficiently.

According to a still further aspect of the present invention, there is provided an information processing apparatus, including recording means for recording data, discrimination means for discriminating whether or not an amount of data recorded on the recording means is greater than a predetermined amount, searching means for searching, when it is discriminated by the discrimination means that the amount of recorded data is greater than the predetermined amount, for a recordable area of a recording medium provided in another apparatus connected to a network to which the information processing apparatus is connected, and moving means for moving the data recorded on the recording means to the recordable area searched out by the searching means.

According to a yet further aspect of the present invention, there is provided an information processing method, including a recording control step of controlling recording of data, a discrimination step of discriminating whether or not an amount of data recorded by the recording control step is greater than a predetermined amount, a searching step of searching, when it is discriminated by the discrimination step the amount of recorded data is greater than the predetermined amount, for a recordable area of a recording medium provided in another apparatus connected to a network to which an information processing apparatus is connected, and a moving step of moving the data recorded by the recording step to the recordable area searched out by the searching step.

According to a yet further aspect of the present invention, there is provided a program storage medium on which a computer-readable program is stored, the computer-readable program including a recording control step of controlling recording of data, a discrimination step of discriminating whether or not an amount of data recorded by the recording control step is greater than a predetermined amount, a searching step of searching, when it is discriminated by the discrimination step the amount of recorded data is greater than the predetermined amount, for a recordable area of a recording medium provided in another apparatus connected to a network to which an information processing apparatus is connected, and a moving step of moving the data recorded by the recording step to the recordable area searched out by the searching step.

In the information processing apparatus, the information processing method and the program stored in the program storage medium, if it is discriminated that the amount of recorded data is greater than a predetermined amount, then a recordable area of a recording medium provided in another apparatus connected to a network is searched for, and the recorded data is moved into the searched out recordable area. Consequently, desired data can be recorded while the user need not take notice of the recording capacity.

The above and other objects, features and advantages of the present invention will become apparent from the following description and the appended claims, taken in conjunction with the accompanying drawings in which like parts or elements denoted by like reference symbols.

DESCRIPTION OF THE PREFERRED EMBODIMENT

Figure 1:
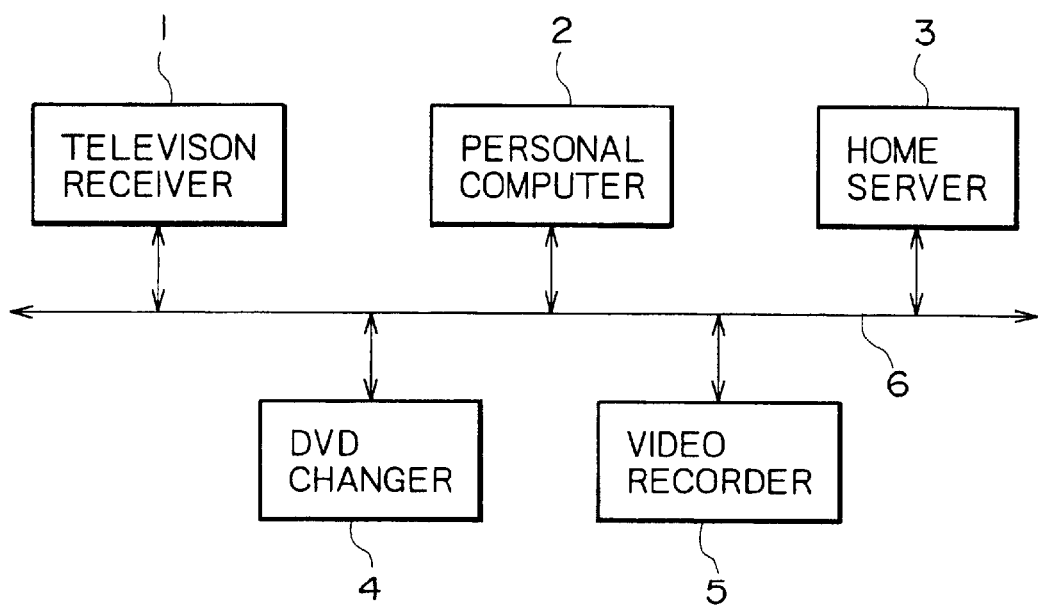
FIG. 1 is a block diagram showing a connection of several apparatus including a video recorder to which the present invention is applied.

Referring first FIG. 1, there is shown a connection between a video recorder to which the present invention is applied and other apparatus. A television receiver 1, a personal computer 2, a home server 3, a DVD (Digital Video Disk) changer 4 and a video recorder 5 are connected to each other by an IEEE 1394 bus 6.

Figure 2:
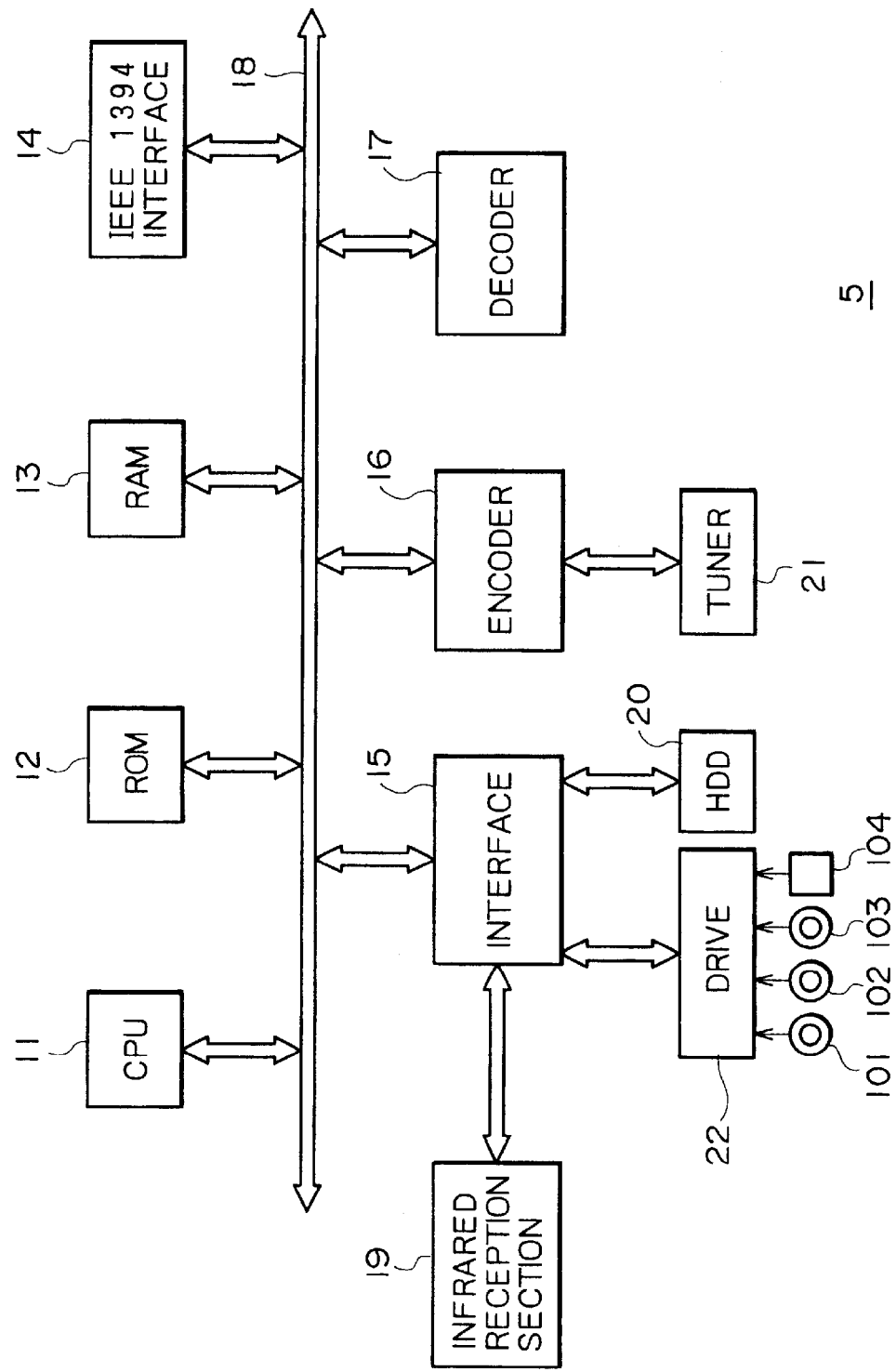
FIG. 2 is a block diagram showing an internal structure of the video recorder shown in FIG. 1.

FIG. 2 shows an internal structure of the video recorder 5. Referring to FIG. 2, a central processing unit (CPU) 11, a read only memory (ROM) 12, a random access memory (RAM) 13, an IEEE 1394 interface 14, an interface 15, an encoder 16 and a decoder 17 are connected to each other by a bus 18. An infrared reception section 19 and a hard disk drive (HDD) 20 are connected to the infrared reception section 19, and a tuner 21 is connected to the encoder 16.

The CPU 11 controls the other components of the video recorder 5 in accordance with a program stored in the ROM 12. Data necessary for the CPU 11 to control the other components are written into and read out from the RAM 13. It is to be noted that the RAM 13 may be formed from a flash memory or a like device.

The IEEE 1394 interface 14 performs interface processing such as to output data of a data packet structure compliant with the IEEE 1394 standards obtained by data conversion to the IEEE 1394 bus 6 or to convert a data packet compliant with the IEEE 1394 standards inputted from the IEEE 1394 bus 6 into data of a data structure to be handled in the video recorder 5 in order to allow communication of data over the IEEE 1394 bus 6. The interface 15 interfaces an operation signal from a remote controller not shown received by the infrared reception section 19 and interfaces writing and reading out of data onto and from the HDD 20. A drive 22 is connected to the interface 15, and a magnetic disk 101, an optical disk 102, a magneto-optical disk 103, a semiconductor memory 104 or a like medium can be loaded into the drive 22.

The tuner 21 extracts a signal of a program desired by a user from a plurality of program signals received by an antenna not shown and outputs the extracted signal to the encoder 16. The encoder 16 encodes the signal of the program received, for example, as analog data or digital data by compression processing and so forth in accordance with a method of the MPEG (Moving Picture Experts Group). The encoder 16 outputs a resulting signal of the encoding to the television receiver 1 through the IEEE 1394 interface 14 and the IEEE 1394 bus 6. Further, where the signal obtained by the encoding by the encoder 16 is a signal of a program reserved for recording, it is recorded onto the HDD 20 through the interface 15. The decoder 17 decodes, when data recorded on the HDD 20 and compressed in accordance with the MPEG are to be transmitted to another recording medium or apparatus to which compressed data in accordance with the MPEG cannot be transmitted directly, the data and outputs the decoded data.

Accordingly, for example, where the television receiver 1 does not have a built-in decoder, a program to be viewed is decoded by the decoder 17 once and then outputted through the IEEE 1394 interface 14 and the IEEE 1394 bus 6. On the other hand, where the television receiver 1 has a built-in decoder, a program to be viewed is outputted directly through the IEEE 1394 interface 14 and the IEEE 1394 bus 6.

Figure 3:
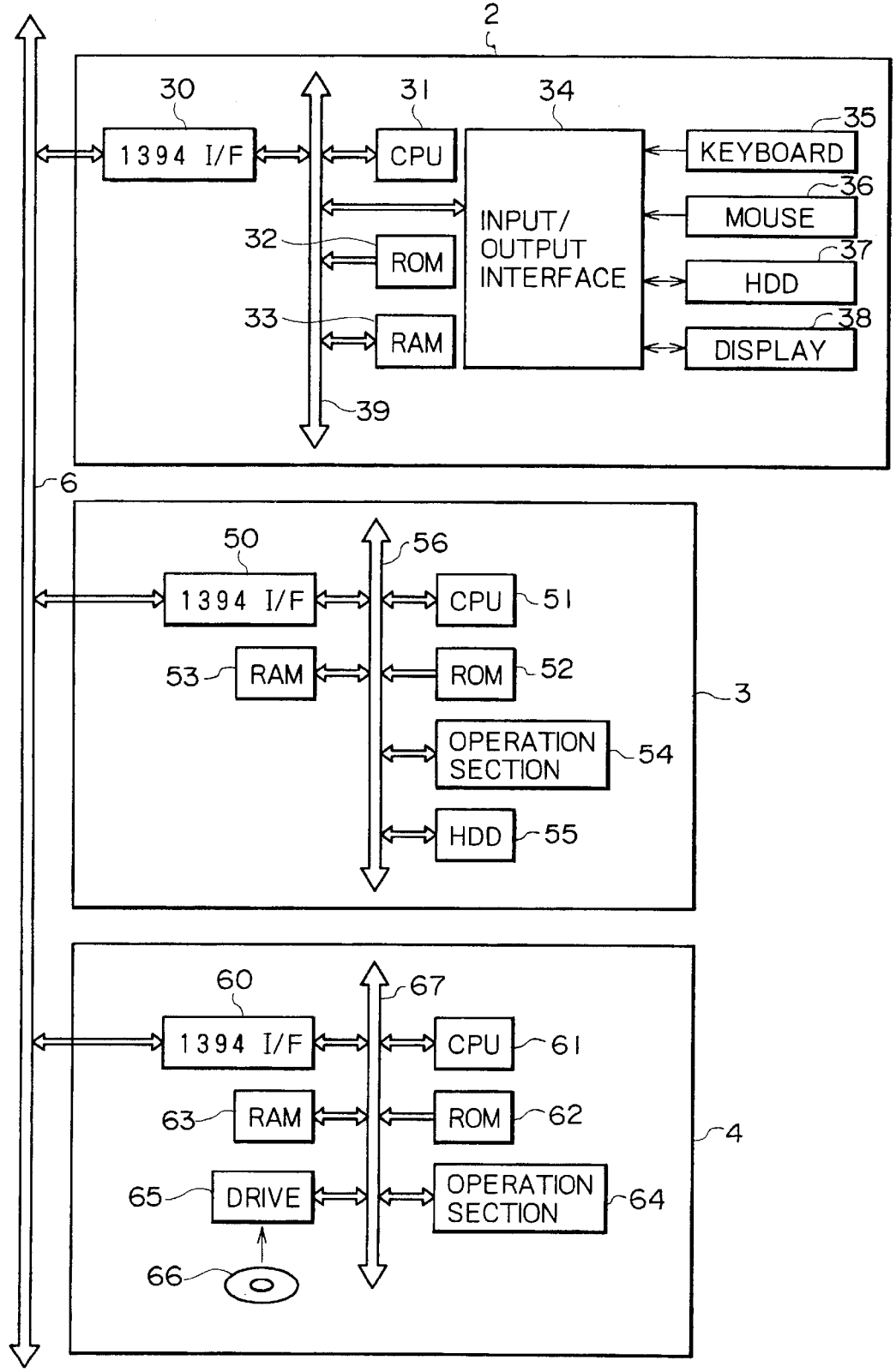
FIG. 3 is a block diagram showing internal constructions of a personal computer, a home server and a DVD changer shown in FIG. 1.

FIG. 3 shows internal constructions of the personal computer 2, home server 3 and DVD changer 4. Referring to FIG. 3, the personal computer 2 is connected to the IEEE 1394 bus 6 through an IEEE 1394 interface (I/F) 30. A CPU 31 executes various processes in accordance with a program stored in a ROM 32. Data and a program necessary for the CPU 31 to execute various processes are suitably stored into a RAM 33. A keyboard 35 and a mouse 36 are connected to an input/output interface (I/F) 34, and the input/output interface 34 outputs a signal inputted from the keyboard 35 or the mouse 36 to the CPU 31.

A hard disk drive (HDD) 37 is connected to the input/output interface 34, and data, a program and so forth can be recorded onto and reproduced from the HDD 37. Also a display unit 38 as a display device is connected to the input/output interface 34. An internal bus 39 formed from a PCI (Peripheral Component Interconnect), a local bus or the like interconnects the components of the personal computer 2.

The home server 3 is connected to the IEEE 1394 bus 6 through an IEEE 1394 interface 50. A CPU 51 executes various processes in accordance with a program stored in a ROM 52. Data, a program and so forth necessary for the CPU 51 to execute various processes are suitably stored into a RAM 53. An operation section 54 is formed from a keyboard, a mouse and so forth and is operated by a user to input an instruction. Data, a program and so forth can be recorded onto and reproduced from a HDD 55. An internal bus 56 interconnects the components of the home server 3.

The DVD changer 4 is connected to the IEEE 1394 bus 6 through a IEEE 1394 interface 60. A CPU 61 executes various processes in accordance with a program stored in a ROM 62. Data, a program and so forth necessary for the CPU 61 to execute various processes are suitably stored into a RAM 63. An operation section 64 is formed from a button, a switch, a remote controller and so forth and outputs, when it is operated by a user, a signal corresponding to the operation. A drive 65 drives a disk 66 to reproduce data recorded on the disk 66 or record data onto the disk 66. A plurality of such disks 66 are available, and when necessary, the disk 66 can be exchanged. An internal bus 67 interconnects the components of the DVD changer 4.

The capacity of the HDD 20 of the video recorder 5 described above is limited, and it is considered that, if a predetermined number of programs are recorded onto the video recorder 5, then the capacity of a recordable area of the video recorder 5 may become short. If the CPU 11 of the video recorder 5 determines that the capacity of the HDD 20 becomes short, then it transfers (exports) data recorded on the HDD 20 to a recording medium such as a HDD included in another apparatus connected to the IEEE 1394 bus 6. Such processing is described with reference to a flow chart of FIG. 4. It is assumed here that the capacity of the HDD 20 is 6 GB (Gigabytes), and of the apparatus connected to the IEEE 1394 bus 6, the HDD 37 of the personal computer 2, the HDD 55 of the home server 3, and the disk 66 of the DVD changer 4 are recording media to which data of a program recorded on the HDD 20 of the video recorder 5 can be transferred (exported). Further, the personal computer 2, home server 3, DVD changer 4 and video recorder 5 can execute a program compliant with the NFS (Network filing System). Each of the devices can make use of the NFS to mutually confirm information of recordable free areas of the HDD 20, HDD 37, HDD 55 and disk 66 built therein over the IEEE 1394 bus 6.

In step S1, the CPU 11 of the video recorder 5 discriminates whether or not the capacity of a recordable area of the HDD 20 is smaller than a predetermined level. For example, if the predetermined level for the capacity of the recordable area is set to 1 GB, then the CPU 11 discriminates whether or not the remaining capacity of the HDD 20 is smaller than 1 GB. The processing in step S1 is executed repetitively until it is discriminated that the remaining capacity is smaller than the predetermined level (hereinafter referred to as 1 GB). It is to be noted that the value of the predetermined level may be set arbitrarily by a user or may otherwise be set in advance upon shipment of the video recorder 5 from a factory. The value of the predetermined level may be determined in accordance with a predetermined reference such as, for example, one half the recording area or a value corresponding to 10 minutes in a high picture quality recording mode.

After it is discriminated in step S1 that the remaining capacity of the HDD 20 is smaller than 1 GB, the processing advances to step S2. In step S2, the CPU 11 detects whether or not an apparatus which includes a recording medium to which data recorded on the HDD 20 can be moved is connected to a network (the IEEE 1394 bus 6).

In particular, in a system compliant with the IEEE 1394 standards, when individual devices connected broadcast the types of the devices with each other, which is performed as initial processing, data regarding the devices are stored with each other. The CPU 11 of the video recorder 5 inquires the individual devices connected thereto of whether or not they possess a storage medium therein using a predetermined inquiry command. Further, the CPU 11 makes use of the NFS described above to successively inquire those devices, which possess a storage medium, of the remaining capacities of the storage media. Each of those devices checks the remaining capacity of the storage medium built therein after each predetermined interval of time, stores a result of the check (remaining capacity) into the RAM 33, 53 or 63 in advance, and transmits the remaining capacity in response to an inquiry from the video recorder 5. Alternatively, when an inquiry is received from the video recorder 5, each of those devices checks the remaining capacity of the storage medium thereof, stores it into the RAM 33, 53 or 63 and sends it back to the video recorder 5.

Since it has been discriminated that the personal computer 2, home server 3 and DVD changer 4 individually include a recording medium onto which data of a program recorded on the HDD 20 can be moved as described above, the processing advances to step S3, in which the CPU 11 calculates a data distribution, that is, amounts of data to be distributed to the recording media of the pertaining apparatus. Here, since the HDD 20 has a capacity of 6 GB and it has been discriminated that the remaining capacity is smaller than 1 GB, data of 5 (=6–1) GB will be moved. Therefore, while the data of 5 GB may all be moved to an apparatus which includes a recording medium having a free capacity of 5 GB, the apparatus itself, for example, the personal computer 2, must still have a remaining capacity for allowing data processed by the personal computer 2 itself to be recorded.

Therefore, the CPU 11 calculates a data distribution, that is, amounts of the data of 5 GB to be moved to the individual apparatus, based on a result of the check in step S2. For example, if it is found that the free capacity of the HDD 37 of the personal computer 2 is 3 GB, the free capacity of the HDD 55 of the home server 3 is 9 GB and the free capacity of the disk 66 of the DVD changer 4 is 3 GB, then the CPU 11 proportionally distributes the data of 5 GB to be moved to the free capacities. In particular, 1 GB to the personal computer 2, 3 GB to the home server 3 and 1 GB to the DVD changer 4 are calculated as the data amounts to be moved to them.

Although the data may be distributed in proportion to the free capacities of the individual apparatus in this manner, the data distribution may be calculated otherwise in accordance with some other calculation strategy or the data may be moved preferentially to a predetermined apparatus. For example, if different apparatus possessed by members of a family are connected to one bus in a home, then it is possible to set in advance so that data may be moved preferentially to an apparatus for a user itself.

After the CPU 11 calculates (determines) a distribution of data in step S3, it moves the data of 5 GB recorded on the HDD 20 in accordance with the determination. Thereupon, the moved data and information regarding the destinations of the movement of the data are recorded in a coordinated relationship onto the HDD 20. This information is recorded into a management information area prepared outside the recording area provided in the HDD 20. In other words, names of destination devices of movement of the moved program and file names in the devices are successively stored into the management information area (FIG. 5).

Figures 4, 5:
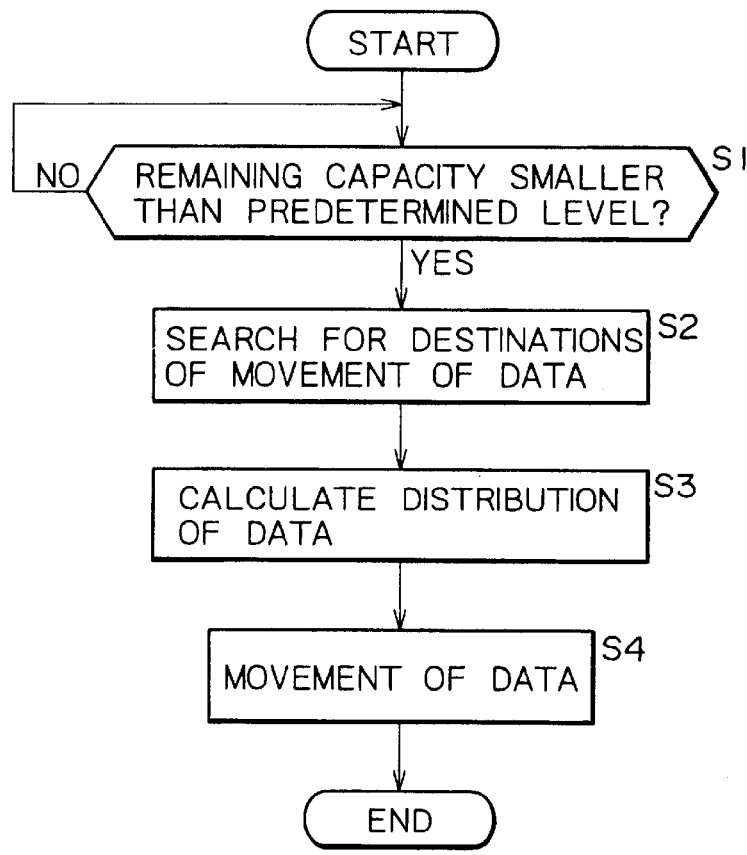
FIG. 4 is a flow chart illustrating processing when data recorded in a hard disk drive in the video recorder of FIG. 2 is moved.
FIG. 5 is a table illustrating management information stored in a management information recording area of the hard disk drive in the video recorder of FIG. 2.

FIG. 5 illustrates management information stored in the management information area provided in the HDD 20. In the management information illustrated in FIG. 5, for a program A, the home server 3 as a device name and data (management information) of a file 10 as a file name are stored; for a program B, the personal computer 2 as a device name and data of a file 100 as a file name are stored; and for a program C, the DVD changer 4 as a device name and data of a file 250 as a file name are stored.

In other words, the program A is recorded in the file 10 of the home server 3; the program B is recorded in the file 100 of the personal computer 2; and the program C is recorded in the file 250 of the DVD changer 4.

Further, the CPU 11 can control so that one program is recorded divisionally onto recording media of a plurality of devices. In this instance, in step S3, the CPU 11 calculates a distribution of the data and records, at rear ends of program data divided in accordance with the distribution, information regarding destinations of movement (destinations of recording) of next program data to succeed the divisional program data in a coordinated relationship into the management information area of the HDD 20. In other words, a device name of a program, a file name in the device name, and a device name of a destination of movement succeeding the program and a file name in the device name are successively stored into the management information area (FIGS. 6A and 6B).

Figure 6:
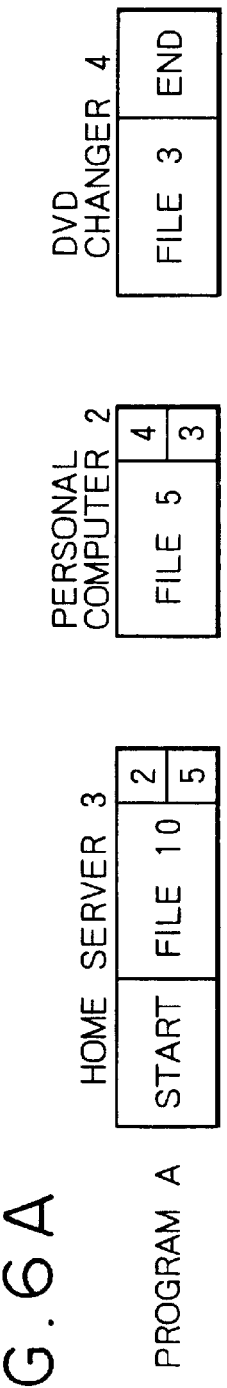
FIGS. 6A and 6B are tables illustrating different examples of management information stored in the management information recording area of the hard disk drive in the video recorder of FIG. 2.

FIGS. 6A and 6B illustrate different examples of management information stored in the management information area provided in the HDD 20.

In the example of FIG. 6A, for a divisional program A, "Start" which signifies that the data is the first divisional data, the home server 3 as a device name, the file 10 as a file name and the personal computer 2 as a device name of the succeeding data and data of the video recorder 5 as a file name of the file are stored in the first entry (it is to be noted that, for simplified illustration, the device name of the succeeding data and the file name are represented in reference characters in FIG. 6A. In the second entry, the personal computer 2 as a device name, the file 5 as a file name, and the DVD changer 4 as a device name of succeeding data and data of the file 3 as a file name of the device are stored. In the third entry, "End" signifying that the data is the last divisional data, the DVD changer 4 as a device name and data of the file 3 of a file name are stored.

In the example of FIG. 6B, for the divisional program A, the home server 3 as a device name, the file 10 as a file name, "Start" (which signifies that the data is the first divisional data) as a device name of the preceding data, and the personal computer 2 as a device name of the succeeding data and data (management information) of the file 5 as a file name are stored in the first entry. In the second entry, the personal computer 2 as a device name, the file 5 as a file name, the home server 3 as a device name of the preceding data, the file 10 as a file name of the device, and the DVD changer 4 as device name of the succeeding data and the file 3 as a file name of the device are stored. Further, in the third entry, the DVD changer 4 as a device name, the file 3 as a file name, the personal computer 2 as a device name of the preceding data, the file 5 as a file name of the device, and "End" (which signifies that the data is the last divisional data) as a device data of the succeeding data are stored.

In particular, the divisional program A is firstly recorded into the file 10 of the home server 3, secondly recorded into the file 5 of the personal computer 2, and thirdly recorded into the file 3 of the DVD changer 4.

In the example of FIG. 6A, since only the destinations of movement of divisional data succeeding each divisional data is stored as management information, the capacity of the management information area can be suppressed to the minimum. Meanwhile, in the example of FIG. 6B, destinations of movement of divisional data preceding to and succeeding each divisional data are recorded as management information to facilitate search of divisional data.

Where a program is recorded onto a plurality of devices as described above, management information (FIGS. 6A and 6B) of device names of destinations of movement preceding to and succeeding each divisional data and file names of the device names is stored in the management information area of the HDD 20 in the video recorder 5 so that, based on the management information, the classified data are reproduced without losing the continuity.

Furthermore, a different example wherein one program is recorded divisionally into recording media of a plurality of devices. In the present example, the CPU 11 calculates a distribution of program data and records the program data divided in accordance with the distribution in a coordinated relationship with information regarding destinations of recording of the next divisional program data succeeding the program data into the individual devices.

In particular, description is given in connection with the example of FIGS. 6A and 6B described hereinabove Data (management information) indicating that the first divisional program data of the program A is recorded in the file 10 of the home server 3 is stored in the management information area of the HDD 20 of the video recorder 5. In the file 10 of the home server 3, data representing that the second divisional program data succeeding the first divisional program data is recorded in the file 5 of the personal computer 2 is recorded together with the first divisional program data of the program A. In the file 5 of the personal computer 2, data representing that the third divisional program data succeeding the second divisional program data is recorded in the file 3 of the DVD changer 4 is recorded together with the second divisional program data of the program A. Further, in the file 3 of the DVD changer 4, the third divisional program data of the program A is recorded together with data indicating that divisional program data succeeding the third divisional program data does not exist.

Accordingly, upon reproduction of the program A, the CPU 11 refers to the management information area of the HDD 20 of the video recorder 5 and thus discriminates that the program A is recorded in the file 10 of the home server 3, and instructs the home server 3 to reproduce the file 10. The home server 3 reproduces the first divisional program data recorded in the file 10 in accordance with the instruction from the CPU 11 and recognizes that the succeeding divisional program data is recorded in the file 5 of the personal computer 2. Consequently, the home server 3 instructs the personal computer 2 to reproduce the file 5 after the reproduction of the first divisional program data comes to an end.

The personal computer 2 reproduces the second divisional program data recorded in the file 5 in accordance with the instruction from the home server 3 and recognizes that the succeeding divisional program data is recorded in the file 3 of the DVD changer 4. The personal computer 2 thus instructs the DVD changer 4 to reproduce the file 3 after reproduction of the second divisional program data comes to an end. The DVD changer 4 reproduces the third divisional program data recorded in the file 3 in accordance with the instruction from the personal computer 2 and recognizes that there is no succeeding divisional program data. The DVD changer 4 thus ends the reproduction processing after reproduction of the third divisional program data comes to an end.

In the example described above, as seen from FIG. 6A, the destinations of movement of the second and succeeding divisional program data of the program A are successively recognized by the individual devices as reproduction proceeds, and the management information area of the HDD 20 is required to store only data representing that the top (first) divisional program data is stored in the file 10 of the home server 3. Therefore, the capacity of the management information area of the HDD 20 can be suppressed further from that of the preceding example.

Where, when the free capacity of the HDD 20 becomes little, data recorded on the HDD 20 are moved to recording media of other apparatus connected to the network in this manner, a desired program can be recorded without taking notice of the capacity of the HDD 20. Further, since data of the HDD 20 are moved to other apparatus, the HDD 20 itself of the video recorder 5 can normally assure a predetermined recording capacity. Further, even if the capacity of the HDD 20 prepared is small, a desired program can be recorded without any problem. Where this system is adopted, particularly compared with reserved recording, it is particularly effective when the time before recording is to be started is short and recording must be performed immediately such as upon starting of recording by a manual operation.

Figure 7:
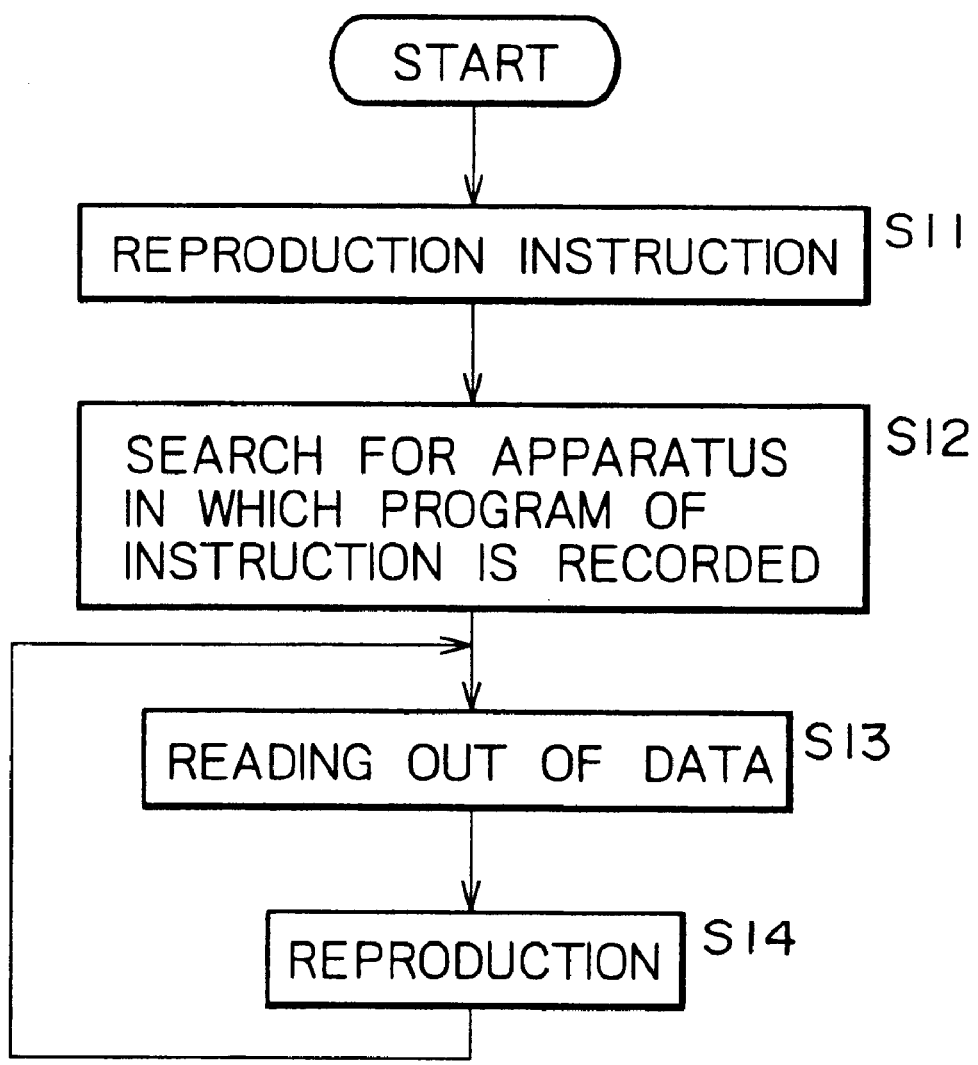
FIG. 7 is a flow chart illustrating reproduction processing of the video recorder of FIG. 2.

Processing when a program recorded in such a manner as described above is reproduced is described with reference to a flow chart of FIG. 7. After predetermined processing is performed by a user to instruct the CPU 11 of the video recorder 5 of reproduction of a desired program in step S11, the CPU 11 checks, in step S12, an apparatus in which the program of an object of the reproduction of the instruction is recorded. This check is performed based on management information (FIG. 5, 6A or 6B) recorded in the management information area of the HDD 20 in which destinations of movement and moved data are recorded in a coordinated relationship. Then, the CPU 11 performs reading out of data based on the management information in step S13.

The data read out from the predetermined apparatus based on the result of the check is inputted to the IEEE 1394 interface 14 of the video recorder 5, decoded by the decoder 17 and outputted to the display device not shown. Alternatively, if the data read out from the predetermined apparatus is outputted to the television receiver 1 which has a decoding function, it is outputted directly without through the decoder 17. The apparatus which receives the outputted data performs reproduction in step S14. The processing in steps S13 and S14 is repetitively performed until the reproduction of the program of the object of the instruction comes to an end or until the reproduction is stopped in response to an instruction of the user.

As described hereinabove, if recorded data can be recorded onto another recording medium connected to the network, then the video recorder 5 itself need not necessarily include a recording medium (the HDD 20). In other words, a video decoder may have such a construction of a video recording controller 81 as shown in FIG. 8 which is different from the video recorder 5 shown in FIG. 2 only in that it does not include the HDD 20.

Figure 8:
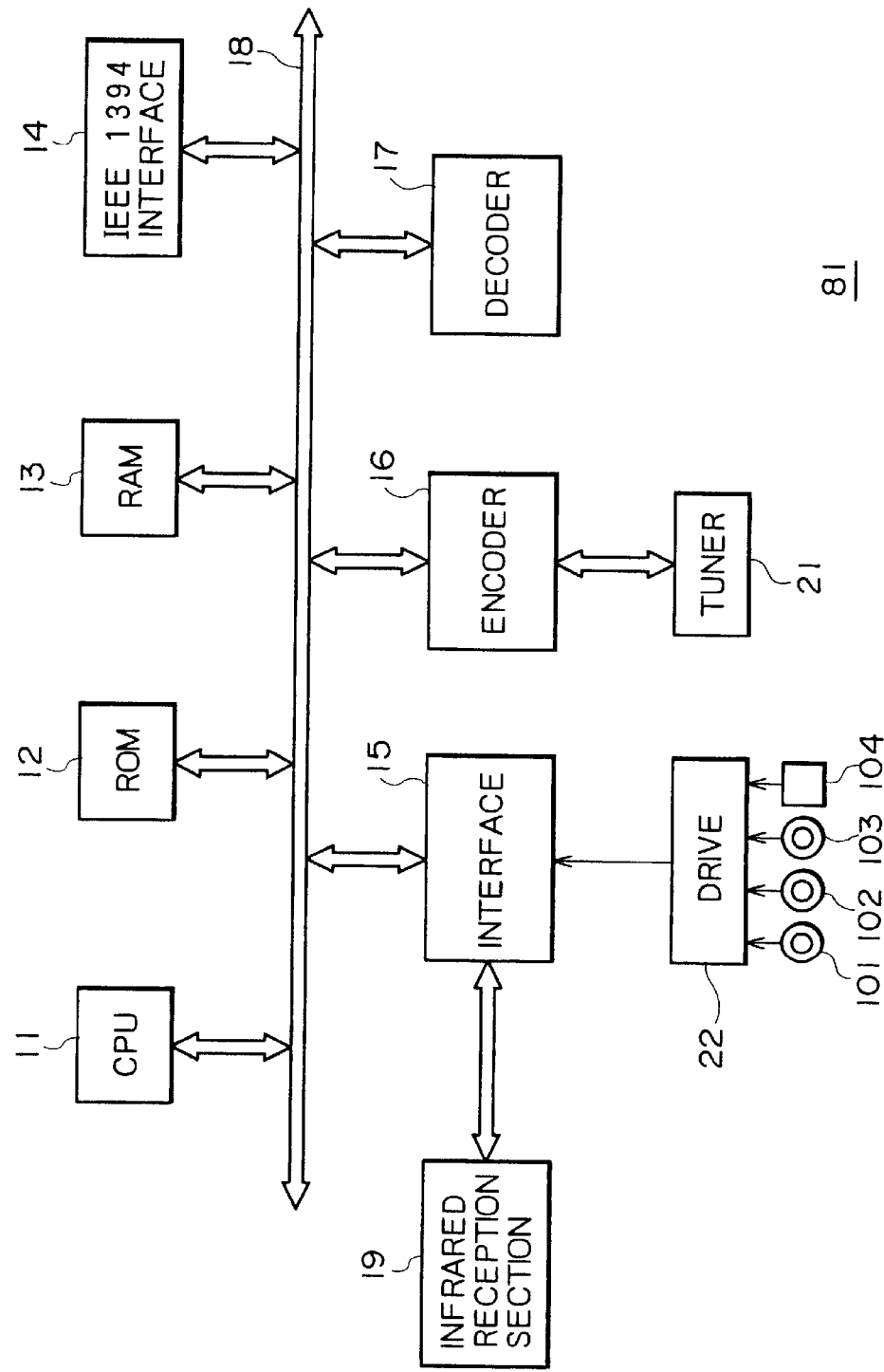
FIG. 8 is a block diagram showing another internal structure of the video recorder shown in FIG. 1.
Figure 9:
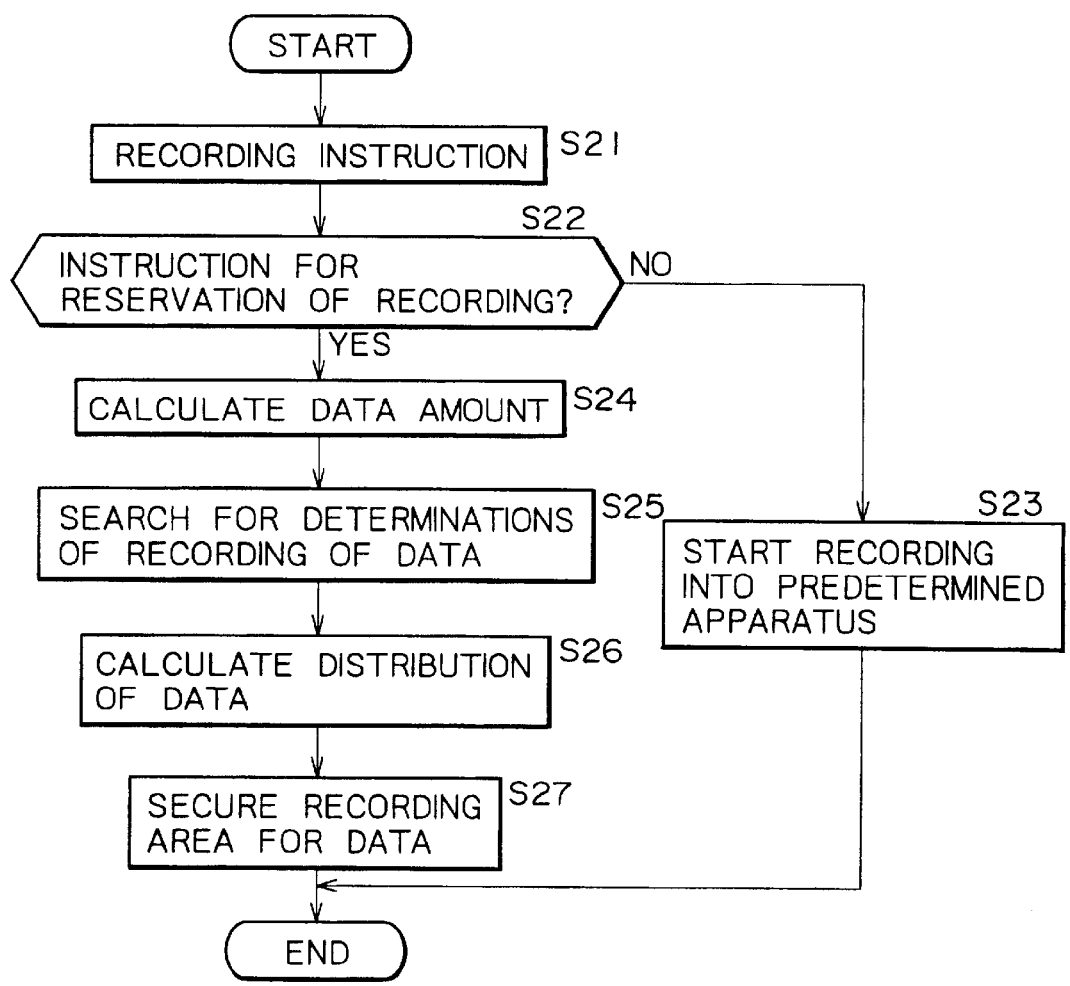
FIG. 9 is a flow chart illustrating recording processing of the video recorder of FIG. 8.

In the following, recording operation of the video recording controller 81 shown in FIG. 8 is described with reference to a flow chart of FIG. 9.

After a recording instruction is inputted by the user in step S21, the CPU 11 of the video recording controller 81 advances its processing to step S22, in which it discriminates whether or not the instruction is an instruction for reservation of recording. Where the instruction is a recording instruction, two different cases are possible including a case wherein a program being received at the point of time of the instruction should be recorded and another case wherein recording of a predetermined program is reserved. If it is discriminated in step S22 that the instruction is not an instruction for reservation of recording, that is, if the instruction is an instruction to record a program being received at a point of time at which the recording instruction is inputted, then the processing advances to step S23, in which the CPU 11 controls the recording medium of the predetermined apparatus to start recording of the program being currently received.

Since the video recording controller 81 does not include a recording medium, data outputted from the tuner 21 to and encoded by the encoder 16 is outputted through the IEEE 1394 interface 14 to the recording medium of an apparatus set as a destination of recording in advance, for example, to the HDD 55 of the home server 3. The apparatus set as the destination of recording may be set by the user, or the video recording controller 81 may selectively set it to that one of the recording media of the apparatus connected to the network which has the greatest free capacity.

On the other hand, if it is discriminated in step S22 that the instruction is an instruction for reservation of recording, then the CPU 11 calculates a data amount of the program reserved for recording.

For example, it is assumed that contents of recording reservation are that the recording time is one and half hours from 9:00 p.m. to 10:30 p.m. and the recording picture quality is the high picture quality recording mode (in the MPEG2, recording for approximately 11 Mbit/sec is possible). From the thus set recording time and recording picture quality, a necessary disk capacity is calculated. In particular, in the specific example described, (one and half hours=) 5,400 seconds×11 Mbit/sec=59,400 Mbit=7.425 GB. In this manner, when reservation of recording is performed, how much of recording capacity is required to record the program can be calculated. After the calculation is completed, the video recording controller 81 checks, in step S25, free capacities of the recording media of the apparatus connected to the network and including the recording media. This processing is similar to the processing in step S2 of the flow chart of FIG. 4 described hereinabove.

In step S26, the CPU 11 calculates a distribution of the data based on the result of the check in step S25. The processing in step S26 is performed in a similar manner as in the processing in step S3 of FIG. 4. After the distribution of the data is calculated in step S26, the processing advances to step S27, in which the CPU 11 controls the recording media of the pertaining apparatus to secure recording areas in accordance with the calculated distribution of the data. In particular, if the result of the calculation in step S26 represents that data of 1 GB should be recorded onto the HDD 37 of the personal computer 2 and data of 2 GB should be recorded onto the HDD 55 of the home server 3, then the CPU 11 controls the recording media of the apparatus to secure areas (partitioning) so that any other data may not be recorded into the recording areas.

As a method for securing the areas, for example, invalid data are recorded into storage areas of the required capacities corresponding to the recording media (HDD 37, 55 and the 66) of the individual apparatus (personal computer 2, home server 3 and DVD changer 4) so that the recording media do not apparently have free areas of the capacities to secure the areas. In this instance, if the video recording controller 81 stores area information of the recording areas of file addresses of the recording media into the RAM 13, then when the reserved time comes, recording of the recording media of the pertaining apparatus is performed based on the stored area information. Alternatively, where a controller for each of the recording media of the pertaining apparatus has a function of securing an area, areas are secured using the function. Then, recording into the recording areas secured in this manner is started when the reserved time comes.

The program recorded in this manner is reproduced in such a manner as described hereinabove with reference to the flow chart of FIG. 7. It is to be noted that, if a recording medium for recording information which indicates a relationship between recording destinations and recorded data is provided not in the HDD 20 but in the video recording controller 81 shown in FIG. 8, then processing similar to that of the video recorder 5 shown in FIG. 2 can be performed. In this instance, the video recording controller 81 may include a recording medium of a capacity smaller than that of the HDD 20.

Figure 10:
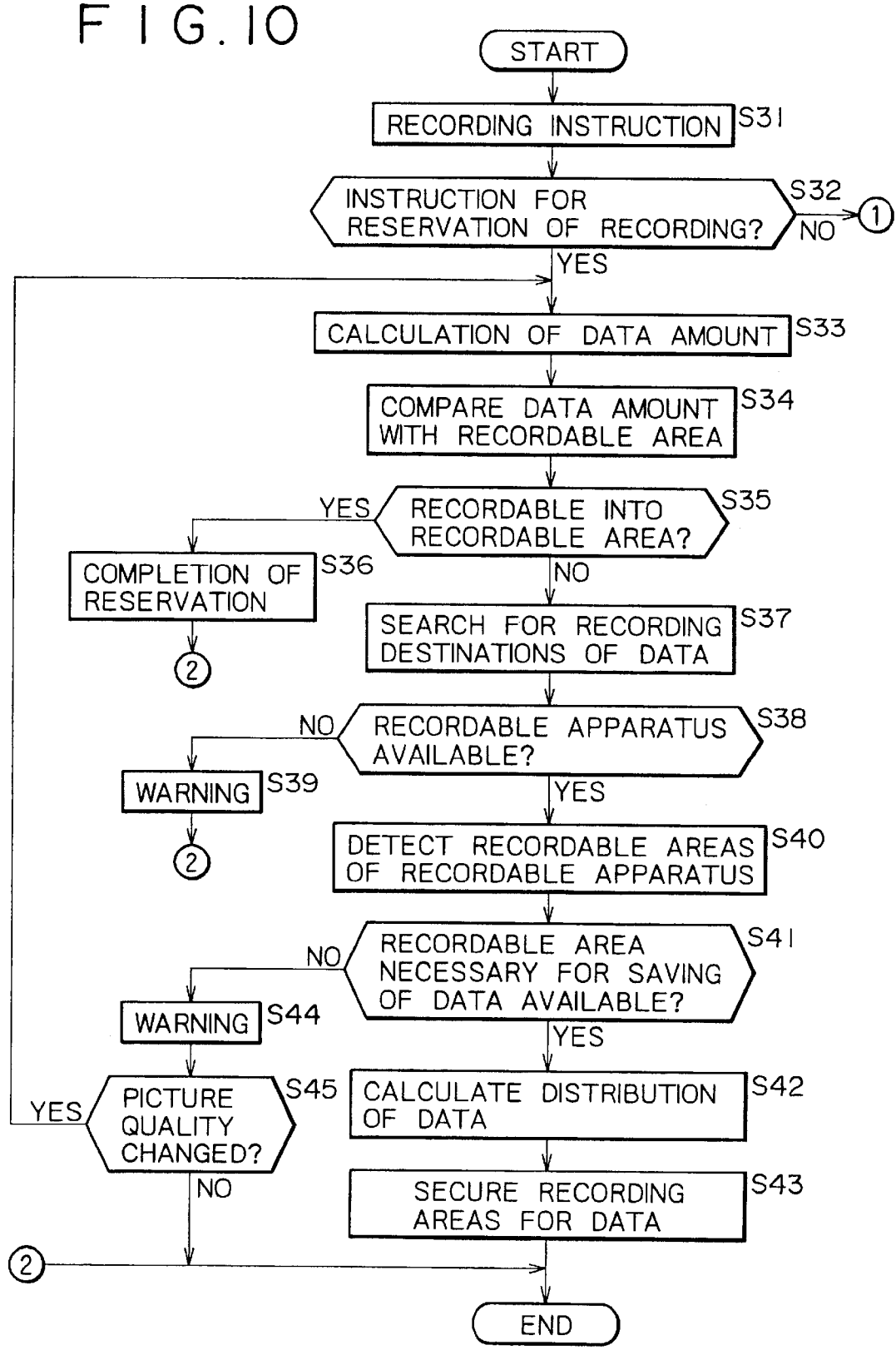
FIGS. 10 and 11 are flow charts illustrating different recording processing of the video recorder of FIG. 1 or 8.
Figure 11:
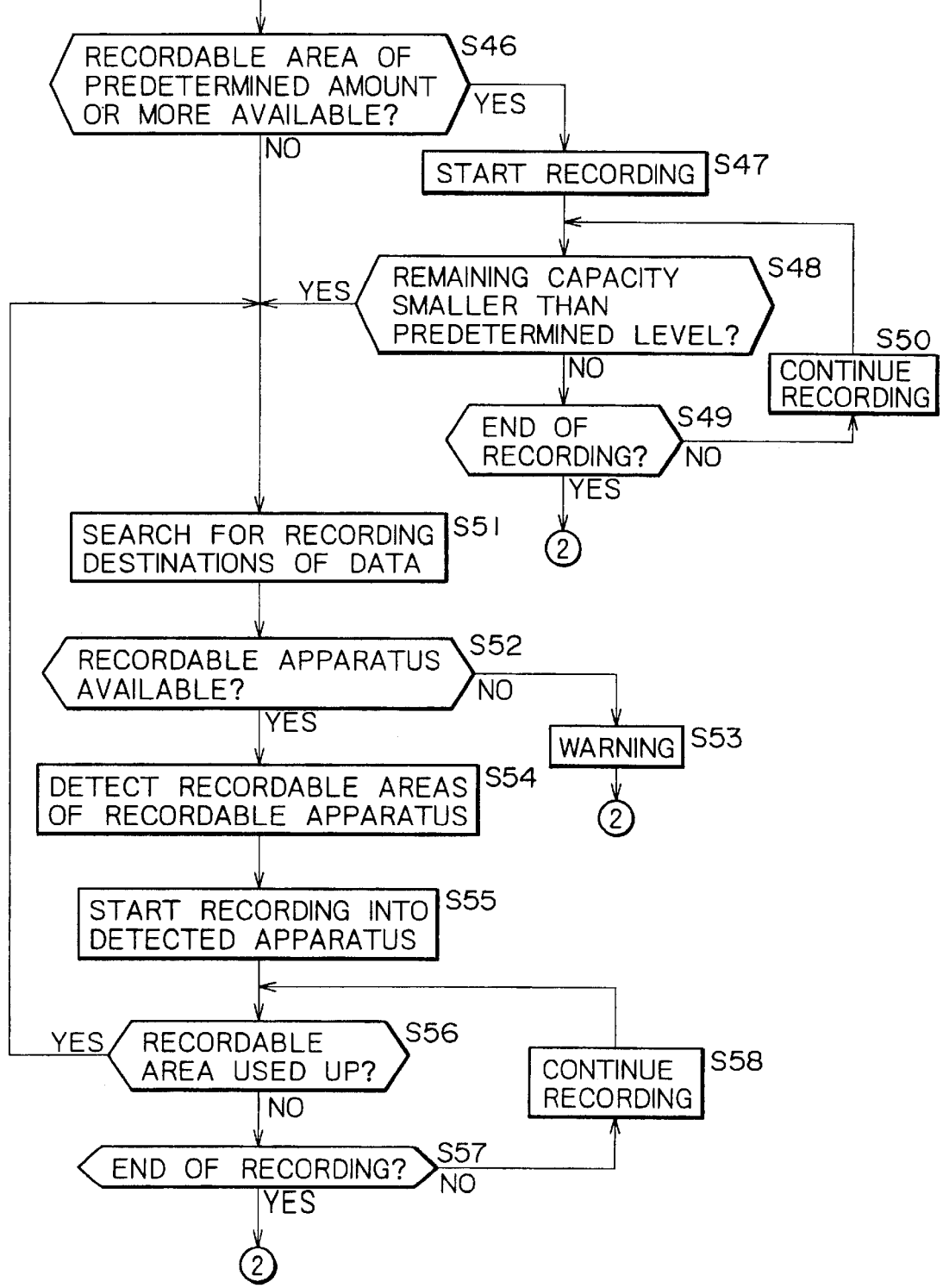

Subsequently, another example of recording operation of the video recorder 5 or the video recording controller 81 is described with reference to FIGS. 10 and 11. Here, description is given taking the video recorder 5 as an example.

If a recording instruction is inputted by a user in step S31, then the CPU 11 of the video recorder 5 advances its processing to step S32, in which the CPU 11 discriminates whether or not the instruction is an instruction for reservation of recording. If the instruction is an instruction for reservation of recording, then the processing advances to step S33, in which the CPU 11 calculates the data amount of the program reserved for recording based on the recording time and the recording picture quality (for example, the high picture quality recording mode). For example, if it is assumed that the calculated data capacity necessary for recording is 7.425 GB, then the CPU 11 compares the data capacity (in the present case, 7.425 GB) calculated by the processing in step S33 with the recordable area of the HDD 20. For example, it is assumed that the capacity of the HDD 20 is 8 GB, of which 5 GB are being used while 3 GB make a recordable area.

In step S35, the CPU 11 discriminates whether or not the reserved program can be recorded into the recordable area of the HDD 20, that is, whether or not the recordable area of the HDD 20 (in the present case, 3 GB) is equal to or greater than the required data capacity (in the present case, 7.425 GB). If it is discriminated that the reserved program can be recorded into the recordable area of the HDD 20, then the processing advances to step S36, in which it is determined that the reservation is completed and the processing is ended.

If it is discriminated in step S35 that the reserved program cannot be recorded fully into the recordable area of the HDD 20, that is, the required data amount (in the present case, 7.425 GB) calculated by the processing in step S33 is greater than the recordable area of the HDD 20 (in the present case, 3 GB), the processing advances to step S37. In step S37, the video recorder 5 searches for those apparatus which are connected to the network and include a recording medium.

In step S38, the CPU 11 discriminates whether or not an apparatus which can record is available, that is, whether or not an apparatus which includes a recording medium is available. If the CPU 11 discriminates that an apparatus which can record is not available, then the processing advances to step S39, in which the CPU 11 controls the monitor not shown to display a message for giving a warning to the user (for example, a message of "No recordable apparatus is available."), whereafter the processing is ended.

If it is discriminated in step S38 that an apparatus which can record is available, then the processing advances to step S40, in which the CPU 11 detects the recordable area (free area) of the recording medium of the apparatus which has been found out to be recordable by the processing in step S38. In step S41, the CPU 11 discriminates, from the recordable area of the apparatus detected by the processing in step S40, whether or not a recordable area necessary for saving of the data is available. If it is discriminated that a recordable area necessary for saving of the data is available, then the processing advances to step S42. Here, it is assumed that the free capacity of the HDD 37 of the personal computer 2 is 3 GB; the free capacity of the HDD 55 of the home server 3 is 9 GB; and the free capacity of the disk 66 of the DVD changer 4 is 3 GB.

In step S42, the CPU 11 calculates a data distribution based on the recordable areas detected by the processing in step S40. This processing is performed in a similar manner as in the processing in step S3 of FIG. 4 or step S26 of FIG. 9. In step S43, the CPU 11 secures recording areas in the recording media of the pertaining apparatus based on the distribution of the data calculated by the processing in step S42.

On the other hand, if it is discriminated in step S41 that a recordable area necessary for data saving is not available, the processing advances to step S44, in which the CPU 11 controls the monitor not shown to display a message for giving a warning to the user (for example, a message of "No recordable area can be secured"), and then the processing advances to step S45. In step S45, the CPU 11 discriminates that the picture quality has been changed by the user (for example, changed from the high picture quality recording mode to the medium picture quality recording mode). If it is discriminated that the picture quality has been changed, then the processing returns to step S33 so that the processing beginning with step S33 described above is repeated. On the other hand, if it is discriminated in step S45 that the picture quality has not been changed by the user, then the processing is ended.

On the other hand, if it is discriminated in step S32 that the instruction is not an instruction for reservation of recording, that is, if it is an instruction for mannual recording, then the processing advances to step S46, in which the CPU 11 discriminates whether or not the recordable area of the HDD 20 is equal to or greater than a predetermined amount. If it is discriminated that the recordable area of the HDD 20 is equal to or greater than the predetermined amount, then the processing advances to step S47, in which the CPU 11 controls the HDD 20 to start recording of the program being received. It is to be noted that the value of the predetermined amount is determined in accordance with a predetermined reference such as, for example, one half the recording area or a value corresponding to 10 minutes in the high picture quality recording mode.

In step S48, the CPU 11 discriminates whether or not the remaining capacity of the HDD 20 is smaller than a predetermined level. If it is discriminated that the remaining capacity of the HDD 20 is not smaller than the predetermined level, that is, if it is discriminated that the HDD 20 still has a recordable area equal to or greater than the predetermined amount, then the processing advances to step S49. In step S49, the CPU 11 discriminates whether or not the recording should be ended. If it is discriminated that the recording should be ended, then the processing is ended. If it is discriminated in step S49 that the recording should not be ended, then the processing advances to step 50, in which the CPU 11 continues the recording. Then, the processing returns to step S48 so that the processing described above is repeated.

If it is discriminated in step S48 that the remaining capacity of the HDD 20 becomes smaller than the predetermined level, then the processing advances to step S51, in which the video recorder 5 searches for an apparatus which is connected to the network and besides includes a recording medium. In step S52, the CPU 11 discriminates whether or not an apparatus which can record is available, that is, whether or not an apparatus which includes a recording medium is available. If it is discriminated that an apparatus which can record is not available, then the processing advances to step S53, in which the CPU 11 controls the monitor not shown to display a message for giving a warning to the user (for example, a message of "No recordable apparatus is available."), whereafter the processing is ended.

If it is discriminated in step S52 that an apparatus which can record is available, then the processing advances to step S54, in which the CPU 11 detects the recordable area (free area) of the recording medium of the apparatus which has been found out to be recordable by the processing in step S52. In step S55, the CPU 11 controls the apparatus which can record to start recording of the program being received into the recordable area detected by the processing in step S54.

In step S56, the CPU 11 discriminates whether or not the recording medium has no recordable area any more. If it is discriminated in step S56 that the recording medium has no recordable area any more, then the processing returns to step S51 so that the processing beginning with step S51 described above is repeated. On the other hand, if it is discriminated in step S56 that the recording medium still has some recordable area, then the processing advances to step S57, in which it is discriminated whether or not the recording should be ended. If it is discriminated that the recording should not be ended, then the processing advances to step S58. In step S58, the CPU 11 continues the recording, and then the processing returns to step S56 so that the processing described above is repeated. Then, if it is discriminated in step S57 that the recording should be ended, the processing is ended.

While, in the foregoing description, an example wherein the present invention is applied to a video recorder is described, the present invention can also be applied to apparatus other than a video recorder.

Further, while the sequences of steps described above can be executed by hardware, they may be executed otherwise by software. In order to cause the sequences of steps to be executed by software, a program which forms the software is installed from a program storage medium into a computer which is incorporated in hardware for exclusive use or, for example, a personal computer for general purpose which can execute various functions by installing various programs.

The program storage medium for storing a program which is to be installed into a computer and enabled to be executed by the computer may be, as seen in FIG. 2 or 8, a magnetic disk 101 (including a floppy disk), an optical disk 102 (including a CD-ROM (Compact Disk Read Only Memory) and a DVD (Digital Versatile Disk)), a magneto-optical disk 103 (including an MD (Mini-Disk)), a package medium formed from a semiconductor memory 104, a ROM 13 in which the program is stored temporarily or permanently, or a hard disk of the HDD 20. Storage of the program into the program storage medium is performed, when necessary, through an interface such as a router or a modem utilizing a wired or wireless communication medium such as a local area network, the Internet or digital satellite broadcasting.

It is to be noted that, in the present specification, the steps which describe the programs stored in the program storage media include not only processes which are performed in a time series in accordance with an order described, but also processes which may not necessarily be processed in a time series but are executed parallelly or individually.

While a preferred embodiment of the present invention has been described using specific terms, such description is for illustrative purposes only, and it is to be understood that changes and variations may be made without departing from the spirit or scope of the following claims.

What is claimed is:

1. An information processing apparatus, comprising:

discrimination means for discriminating whether an instruction is for reservation of recording of a program;

calculating means for calculating a data amount of said program reserved for recording based on a recording based on a recording time and a recording picture quality when said discrimination means discriminates that said instruction is for reservation of recording;

searching means for searching, in response to said data amount calculated by said calculating means, for a recordable area of a recording medium provided in another apparatus connected to a network to which said information processing apparatus is connected;

securing means for securing a recording area for recording said data in said recordable area found by said searching means; and recording means for recording said data on the recording area secured by said securing means.

2. An information processing method for use in an information processing apparatus, comprising:

a discrimination step for discriminating whether an instruction is for reservation of recording of a program;

a calculating step for calculating a data amount of said program reserved for recording based on a recording time and a recording picture quality when said discrimination step discriminates that said instruction is for reservation of recording;

a searching step of searching, in response to said data amount calculated in said calculating step, for a recordable area of a recording medium provided in another apparatus connected to a network to which the information processing apparatus is connected;

a securing step of securing a recording area for recording said data in said recordable area found by the searching step; and a recording step of recording said data on the recording area secured by the securing step.

3. A program storage medium on which a computer-readable program is stored, the computer-readable program including:

a discrimination step for discriminating whether an instruction is for reservation of recording of a program;

a calculating step for calculating a data amount of said program reserved for recording based on a recording time and a recording picture quality when said discrimination step discriminates that said instruction is for reservation of recording;

a searching step of searching, in response to said data amount calculated in said calculating step, for a recordable area of a recording medium provided in another apparatus connected to a network to which an information processing apparatus having loaded therein the program storage medium is connected;

a securing step of securing a recording area for recording step data in said recordable area found by the searching step; and a recording step of recording said data on the recording area secured by the securing step.

4. An information processing apparatus, comprising:

recording means for recording data;

discrimination means for discriminating whether an amount of data recorded on said recording means is greater than a predetermined amount;

searching means for searching, when it is discriminated by said discrimination means that the amount of recorded data is greater than the predetermined amount, for a recordable area of a recording medium provided in each of a plurality of apparatuses connected to a network to which said information processing apparatus is connected;

calculating means for calculating a data distribution to move to the apparatuses based on said recordable area searched by said searching means; and moving means for moving the data recorded on said recording means to the recordable area found by said searching means based on the data distribution calculated by said calculating means.

5. The information processing apparatus according to claim 4, wherein moving destinations of divisional data preceding or succeeding each divisional data are recorded as management information.

6. An information processing method for use in an information processing apparatus, comprising:

a recording control step of controlling recording of data;

a discrimination step of discriminating whether an amount of data recorded by the recording control step is greater than a predetermined amount;

a searching step of searching, when it is discriminated by the discrimination step that the amount of recorded data is greater than the predetermined amount, for a recordable area of a recording medium provided in each of a plurality of apparatuses connected to a network to which the information processing apparatus is connected;

a calculating step for calculating a data distribution move to the apparatuses based on said recordable area searched by said searching step; and a moving step of moving the data recorded by the recording step to the recordable area searched out by the searching step based on the data distribution calculated by the calculating step.

7. A program storage medium on which a computer-readable program is stored, the computer-readable program including:

a recording control step of controlling recording of data;

a discrimination step of discriminating whether or not an amount of data recorded by the recording control step is greater than a predetermined amount;

a searching step of searching, when it is discriminated by the discrimination step the amount of recorded data is greater than the predetermined amount, for a recordable area of a recording medium provided in each of a plurality of apparatuses connected to a network to which an information processing apparatus having loaded therein the program storage medium is connected;

a calculating step for calculating a data distribution to move the apparatuses bases on said recordable area searched by said searching step; and a moving step of moving the data recorded by the recording step to the recordable area searched out by the searching step based on the data distribution calculated by the calculating step.

8. An information processing apparatus, comprising:

first searching means for searching, when an instruction to record data is received, for a first recording area of a first recording medium provided in other apparatuses connected to a network to which said information processing apparatus is connected;

first recording means for recording the data into the first recording area searched by the first searching means;

discriminating means for discriminating when a remaining capacity of the first recording area becomes smaller than a predetermined level;

second searching means for searching for a second recordable area of a second recording medium provided in the other apparatuses when the discriminating means discriminates that the remaining capacity of the first recording area becomes smaller than the predetermined level;

second recording means for recording the data into the second recording area searched by the second searching means.

9. An information processing method for use in an information processing apparatus, comprising:

a first searching step for searching, when an instruction to record data is received, for a first recording area of a first recording medium provided in other apparatuses connected to a network to which said information processing apparatus is connected;

a first recording step for recording the data into the first recording area searched out by the first searching step;

a discriminating step for discriminating when a remaining capacity of the first recording area becomes smaller than a predetermined level;

a second searching step for searching for a second recordable area of a second recording medium provided in the other apparatuses when the discriminating step discriminates that the remaining capacity of the first recording area becomes smaller than the predetermined level;

a second recording step for recording the data into the second recording area searched by the second searching means.

10. A program storage medium on which a computer-readable program is stored, the computer-readable program including:

a first searching step for searching, when an instruction to record data is received, for a first recording area of a first recording medium provided in other apparatuses connected to a network to which said information processing apparatus is connected;

a first recording step for recording the data into the first recording area searched out by the first searching step;

a discriminating step for discriminating when a remaining capacity of the first recording area becomes smaller than a predetermined level;

a second searching step for searching for a second recordable area of a second recording medium provided in the other apparatuses when the discriminating step discriminates that the remaining capacity of the first recording area becomes smaller than the predetermined level;

a second recording step for recording the data into the second recording area searched by the second searching means.

11. An information processing apparatus, comprising:

first discriminating means for discriminating whether an instruction is an instruction for reservation of recording of a program;

first calculating means for calculating a data amount of the program reserved for recording based on a recording time and a recording picture quality when said first discrimination means discriminates that the instruction is for reservation of recording;

first searching means for searching for a recording medium provided in a plurality of other apparatuses connected to a network to which the information processing apparatus is connected based on the data amount calculated by the first calculating means;

second discrimination means for discriminating whether the data amount recorded on the recording medium searched by the first searching means is greater than a predetermined amount;

second searching means for searching for a recordable area of a recording medium provided in the plurality of other apparatuses connected to the network;

second calculating means for calculating a data distribution to be moved to the other apparatuses based on the recordable area searched out by the second searching means;

moving means for moving data to the recordable area based on the data distribution calculated by said second calculating means;

securing means for securing a recording area for recording the data in the recordable area of the recording medium searched by the first searching means; and recording means for recording the data into the recording area secured by the securing means.

12. An information processing method for use in an information processing apparatus, comprising:

a first discriminating step for discriminating whether an instruction is an instruction for reservation of recording of a program;

a first calculating step for calculating a data amount of the program reserved for recording based on a recording time and a recording picture quality when said first discrimination step discrimiates that the instruction is for reservation of recording;

a first searching step for searching for a recording medium provided in a plurality of other apparatuses connected to a network to which the information processing apparatus is connected based on the data amount calculated by the first calculating step;

a second discrimination step for discriminating the data amount recorded on the recording medium searched by the first searching step is greater than a predetermined amount;

a second searching step for searching for a recordable area of a recording medium provided in the plurality of other apparatuses connected to the network;

a second calculating step for calculating a data distribution to be moved to the other apparatuses based on the recordable area searched out by the second searching step;

a moving step for moving data to the recordable area based on the data distribution calculated by said second calculating step;

a securing step for securing a recording area for recording the data in the recordable area of the recording medium searched by the first searching step; and a recording step for recording the data into the recording area secured by the securing step.

13. A program storage medium on which a computer-readable program is stored, the computer-readable program including:

a first discriminating step for discriminating whether an instruction is an instruction for reservation of recording of a program;

a first calculating step for calculating a data amount of the program reserved for recording based on a recording time and a recording picture quality when said first discrimination step discrimiates that the instruction is for reservation of recording;

a first searching step for searching for a recording medium provided in a plurality of other apparatuses connected to a network to which the information processing apparatus is connected based on the data amount calculated by the first calculating step;

a second discrimination step for discriminating the data amount recorded on the recording medium searched by the first searching step is greater than a predetermined amount;

a second searching step for searching for a recordable area of a recording medium provided in the plurality of other apparatuses connected to the network;

a second calculating step for calculating a data distribution to be moved to the other apparatuses based on the recordable area searched out by the second searching step;

a moving step for moving data to the recordable area based on the data distribution calculated by said second calculating step;

a securing step for securing a recording area for recording the data in the recordable area of the recording medium searched by the first searching step; and a recording step for recording the data into the recording area secured by the securing step.

* * * * *